United States Patent [19]

Föhl

[11] Patent Number: 4,927,175
[45] Date of Patent: May 22, 1990

[54] DRIVE DEVICE FOR RESTRAINING SYSTEMS IN MOTOR VEHICLES

[75] Inventor: Artur Föhl, Schorndorf, Fed. Rep. of Germany

[73] Assignee: TRW Repa GmbH, Alfdorf, Fed. Rep. of Germany

[21] Appl. No.: 366,780

[22] Filed: Jun. 15, 1989

[30] Foreign Application Priority Data

Sep. 29, 1988 [EP] European Pat. Off. ........ 88116072.5

[51] Int. Cl.$^5$ ............................................. B60R 21/10
[52] U.S. Cl. .................................. 280/806; 280/736; 297/480
[58] Field of Search ......................... 280/806; 242/107

[56] References Cited

U.S. PATENT DOCUMENTS

| | | | |
|---|---|---|---|
| 4,385,775 | 5/1983 | Shimogawa et al. | 280/806 |
| 4,423,846 | 1/1984 | Fohl | 242/107 |
| 4,458,921 | 7/1984 | Chiba et al. | 280/806 |
| 4,573,322 | 3/1986 | Fohl | 280/806 |
| 4,789,185 | 12/1988 | Fohl | 280/806 |

FOREIGN PATENT DOCUMENTS

| | | | |
|---|---|---|---|
| 2408173 | 9/1974 | Fed. Rep. of Germany | 280/806 |
| 3131637 | 1/1983 | Fed. Rep. of Germany | |
| 212151 | 9/1988 | Japan | 280/806 |
| 01664 | 3/1987 | PCT Int'l Appl. | |

Primary Examiner—Kenneth R. Rice
Attorney, Agent, or Firm—Tarolli, Sundheim & Covell

[57] ABSTRACT

The drive device of lightweight construction for restraining systems in motor vehicles, in particular safety-belt tightening means, comprises a pyrotechnical gas generator, the gases of which act on a working chamber. The working chamber comprises an outwardly leading relief path which is sealed by a closure element of a material which at a temperature which lies above the operating temperature range of the gas generator but which at the most is equal to the self-igniting temperature of the gas generator softens at least to such an extent that the closure element on ignition of the gas generator frees the relief path but which at temperatures beneath the operating temperature range of the gas generator has a mechanical strength such that the relief path remains sealed by the closure element under the gas action.

15 Claims, 1 Drawing Sheet

U.S. Patent  May 22, 1990  4,927,175
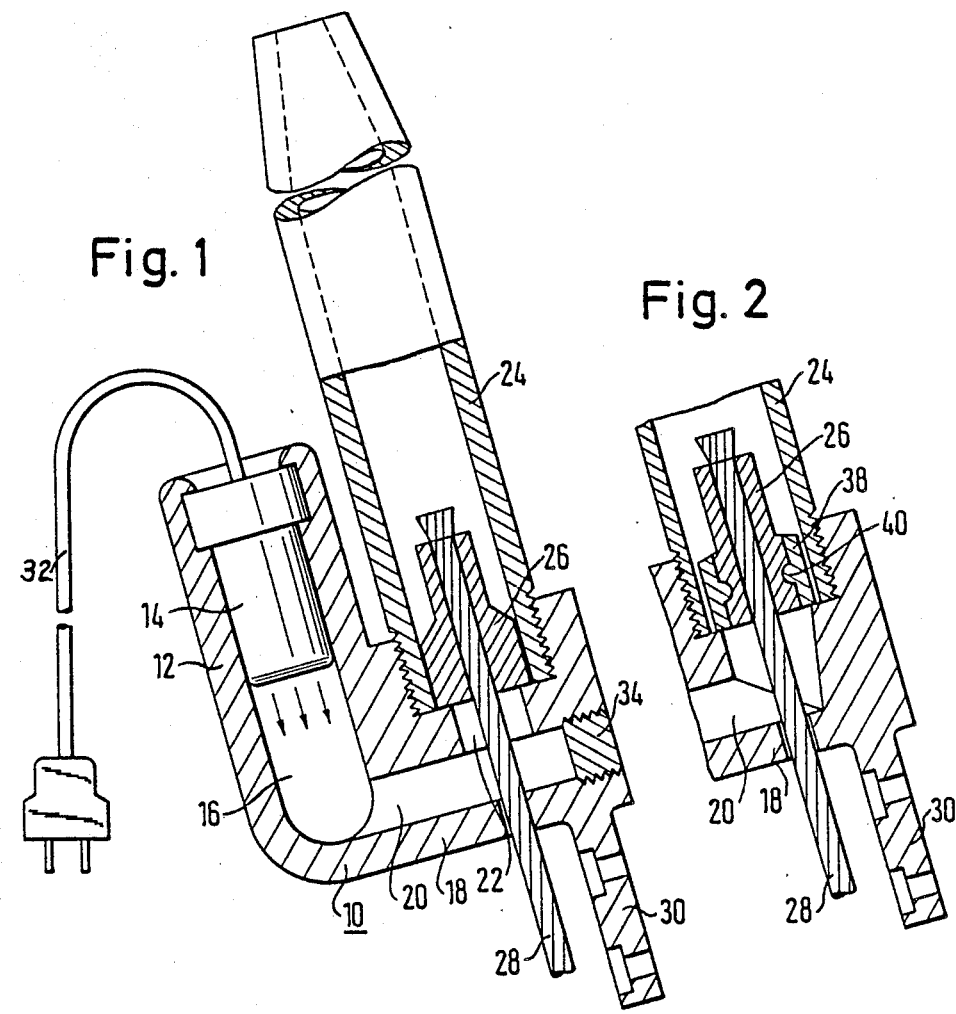
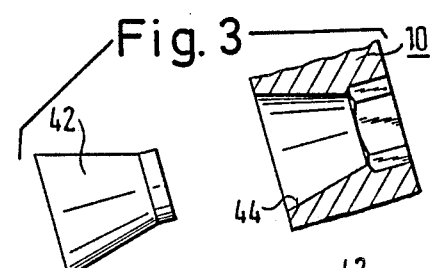
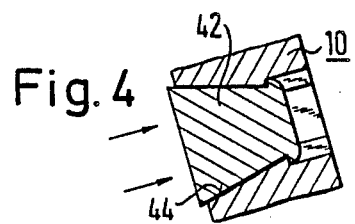

DRIVE DEVICE FOR RESTRAINING SYSTEMS IN MOTOR VEHICLES

The present invention relates to a drive device for restraining systems in motor vehicles.

Such drive devices are required for example in safety-belt tightening means as known from German specification as laid open to inspection No. 3,131,637.

Pyrotechnical gas generators are particularly suitable as energy sources for drive devices of this type because they are able within a very short period of time of a few milliseconds to supply the necessary gas amounts under extremely high pressure. The working chamber of the device, for example a cylinder in which a piston slides, must withstand these high pressures. The predominant aim in motor vehicle construction for lightweight design to save weight and material is limited here by the minimum requirements made of the mechanical strength of the device.

Still higher requirements of the mechanical strength result from the fact that any danger due to bursting or flying parts is to be excluded, even on self-ignition of the gas generator due to unusual heating, in particular when the motor vehicle catches fire. The energy liberated by a gas generator is very much higher at temperature in the range of the self-ignition temperature than at normal operating temperatures, the upper limit of which is about 80°. Moreover, the parts of a device made in lightweight design, in particular from aluminium or aluminium alloys, will themselves lose a considerable amount of their mechanical strength on heating to the self-ignition temperature of the gas generator, for example about 180° C. Particularly weak points are screw connections which however under normal operating conditions perfectly well meet the demands made of them as regards mechanical strength.

The present invention provides a drive device for restraining systems which includes a pyrotechnical gas generator and wherein the basic design and dimensioning is unchanged compared with a construction designed for moderate operating temperature, any danger from bursting or flying parts being nevertheless excluded even when the device is heated to the self-igniting temperature of the gas generator.

In the drive device according to the invention the working chamber comprises an outwardly leading relief path which is sealed by a closure element of a material which at a temperature which lies above the operating temperature range of the gas temperature and which is at the most equal to the self-igniting temperature of the gas generator softens at least to such an extent that the closure element on ignition of the gas generator frees the relief path but which at temperatures within the operating temperature range of the gas temperature has a mechanical strength such that the relief path remains sealed by the closure element under the gas action. It is ensured with this construction of the drive device according to the invention that on self-ignition of the gas generator, for example due to the motor vehicle catching fire, the gases then generated under particularly high pressure can largely escape via the relief path. Subjecting the working chamber to an extremely high gas pressure is therefore avoided. Consequently, no excessive demands need be made of the mechanical strength of the working chamber and therefore the desired lightweight construction is not made impossible by any need to avoid danger from the drive device also when self-ignition of the gas generator takes place. As long as the heating of the drive or propulsion device remains within the limits of the normal operating temperature range, for example up to a maximum of 80° C., the relief passage remains however reliably sealed by the closure element and consequently the function of the drive device is not impaired.

When the upper limit of the operating temperature range of the gas generator lies at about 80° C. the softening temperature of the material of which the closure element consists should be about 120° C. to 130° C.; as a general rule, between the softening temperature of the material of which the closure element consists and the self-ignition temperature of the gas generator there should be approximately the same or a somewhat greater temperature difference as between the softening temperature and the upper limit of the operating temperature range of the gas generator. It is achieved in this manner that firstly within the normal operating temperature range the closure element does not lose any of its strength and secondly however when the self-ignition temperature is reached the softening of the closure element has already progressed to such an extent that freeing of the relief passage is ensured with great certainty.

The closure element is preferably incorporated in form-locking manner in a passage forming the relief path. A particularly high loadability of the closure element results if the latter comprises a widened base surface facing the gas action, i.e. in particular is made frusto-conical, and its firm fit in the passage is promoted under the action of the gas by a wedging effect. The closure element then forms a plug sealing an outwardly leading opening of the working chamber. Said plug can also be made by filling the opening by casting, thereby simplifying the production.

The invention is applicable with particular advantage to the linear drive of a safety-belt tightening means having a working chamber which is formed by a cylinder in which a piston is slidingly displaceable by pressure action on the end faces thereof. The cylinder can consist of aluminium and be screwed to the base receiving the gas generator although such a design might possibly not stand up to the extremely high stresses which would occur on self-ignition of the gas generator due to excessive heating of the device if no relief path were present.

In such an application the relief path can be formed between the inner wall of the cylinder and the piston, in particular in the form of a ring which surrounds the surface of the piston and which is connected in form-locking manner to the piston. Such an embodiment requires only slight modifications of an existing construction in order to provide the latter with the relief path according t the invention.

A modification of an existing construction which can likewise be made with little expenditure is possible with constructional forms in which the cylinder is connected to the gas generator via an angled passage. The relief path is then formed as bore sealed by the closure element in the extension of one of the angled branches of the passage.

The material from which the closure element is formed may be metallic or synthetic. Particularly expedient are eutectic alloys, in particular an alloy of 55.5% by weight Bi and 44.5% by weight Pb. The melting temperature of such a eutectic alloy is 124° C.

Particularly suitable plastics are plastics which have a high mechanical strength up to their softening, which is true in particular of polypropylene, the softening temperature of which is about 130° C. or somewhat higher.

Further features and advantages of the invention will be apparent from the following description of several embodiments and from the drawings to which reference is made and in which:

FIG. 1 is a schematic longitudinal section of an embodiment in which the drive or propulsion device forms a piston/cylinder drive for a safety-belt tightening means;

FIG. 2 is a variant of said embodiment;

FIG. 3 shows a closure element and the opening for receiving the latter prior to assembly of the closure element; and FIG. 4 shows the same closure element and the same opening after assembly of the closure element.

The drive device shown in FIG. 1 for a safety-belt tightening means includes a generally L-shaped housing 10 in one leg 12 of which a receiving bore is formed for a pyrotechnical gas generator 14, said bore continuing in a passage 16 up to the other leg 18 bent at right-angles and merging into a passage 20 formed therein. Opening into said passage 20 is a passage 22 which runs parallel to the passage 16 and merges into the interior of a cylinder 24. Said interior of the cylinder 24 forms a working chamber in which a piston 26 is slidingly displaceable. The end of a pulling cable 28 is secured in said piston 26. Said pulling cable 28 engages the periphery of a pulley 30 which converts the linear movement of the piston 26 to a rotational movement which is transmitted to the belt spool of a belt retractor to tighten the webbing. The housing 10 is equipped with a mounting flange 30.

The gas generator 14 comprises an electrical igniter 35 which is connected via a connecting cable 32 to triggering electronics.

Both the housing 10 and the cylinder 24 are made of a lightweight material of lower strength, in particular aluminium. The mounting of the cylinder 24 on the housing 10 is by a thread connection in that the externally threaded end of the cylinder 24 is screwed into an internally threaded widening of the passage 22.

In normal operation of the drive device the pyrotechnical gas generator 14 is fired by means of its electrical igniter by appyling a triggering pulse via the cable 32, whereupon gases generated under high pressure act via the passages 16, 20 and 22 on the end face of the piston 26 and propel the latter forwardly in the drive chamber within the cylinder 24 until said piston is retarded in a constriction at the end of the cylinder 24.

To avoid any danger by bursting or flying parts on heating of the device to an extent that the gas generator 14 reaches its self-ignition temperature the device is provided with a relief path which however is only freed when a temperature is reached which lies appreciably above the limit of the normal operating temperature range. This relief path is formed by an extension of the passage 20. Said extension of the passage 20 forms an opening in the housing 10 which is sealed by a closure element 34. Said closure element 34 fits in form-locking manner in the end of the passage 20. In the embodiment shown the form-locking is effected by an external thread of the closure element 34 which is screwed into a corresponding internal thread at the exit of the passage. The closure element 34 consists of a material which on heating to temperatures within the operating temperature range of the device, for example up to 80° C., has an adequate mechanical strength to withstand the gas pressure in the normal function of the gas generator 14. On the other hand, the material of which the closure element 34 consists has a melting or softening point which lies beneath the self-igniting temperature of the gas generator 14, for example up to about 120° to 140° C. when the self-igniting temperature lies at about 180° C.

A suitable material for the closure element 34 is a eutectic alloy of 55.5% by weight Bi and 44.5% by weight Pb. Said alloy has a melting point of about 124° C.

Plastics having a softening point in the range of about 120° to 150° C. are however also suitable. Particularly suitable is polypropylene with a melting point of about 130° to 150° C.

In the embodiment shown in FIG. 2 the closure element of the relief passage is formed by a ring 38 which surrounds the outer surface of the piston 26 and is connected in form-locking manner to the latter by an integrally formed rib 40. The ring forming the closure element 38 is thus disposed between the piston 26 and the inner surface of the cylinder 24.

In the embodiment shown in FIGS. 3 and 4 the closure element 42 forms a frusto-conical plug which is inserted into a correspondingly formed opening 44 of the housing 10 in such a manner that its large base area faces the interior of the housing 10. After insertion of the closure element 42 into the opening a firm fit is made by caulking the tapered end of the frusto-conical closure element 42; this state is shown in FIG. 4.

The closure elements 38 and 42 may be made of the same material as the closure element 34. A simple production of the plug-like closure element 34 or 42 is achieved by closing the receiving opening for said closure element by filling with cast material, in particular a eutectic alloy.

I claim:

1. A drive device for restraining systems in motor vehicles comprising a working chamber and a pyrotechnical gas generator, which, when energized, produces gas with an operating temperature and acting on said working chamber, said working chamber comprising an outwardly leading relief and a closure element sealing said relief path and consisting of a material which at a temperature exceeding said operating temperature but not exceeding a self-igniting temperature of said gas generator softens at least to such an extent that said closure element on self-ignition of said gas generator frees said relief path but, at temperatures corresponding to said operating temperature, has a sufficient mechanical strength to ensure that said relief path remains sealed by said closure element under exposition to gas produced by said gas generator.

2. The drive device according to claim 1, wherein said gas generator produces gas within an operating temperature range and there is, between said softening temperature of the material of which said closure element consists and said self-igniting temperature of said gas generator, approximately the same or a somewhat greater temperature difference as between said softening temperature and an upper limit of said operating temperature range.

3. The drive device according to claim 2, wherein said upper limit of the operating temperature range of the gas generator lies at about 80° C. and the softening temperature of the material of which said closure element consists is about 120° C. to 130° C.

4. The drive device according to claim 1, wherein said closure element is matingly received in a corresponding passage forming said relief path.

5. The drive device according to claim 4, wherein said closure element comprises a widened base surface facing the gas action and a firm fit in said passage under the action of the gas is promoted by a wedging effect.

6. The drive device according to claim 1, wherein said closure element forms a plug sealing an outwardly leading opening of said working chamber.

7. The drive device according to claim 6, wherein said plug is made by filling said opening by casting.

8. The drive device according to claim 1, wherein said drive device is a linear drive for a safety-belt tightening means and has a cylinder forming said working chamber a piston being slidingly received in said cylinder.

9. The drive device according to claim 8, wherein said relief path is formed between an inner wall of said cylinder and said piston.

10. The drive device according to claim 9, wherein said closure element is formed as a ring which encircles the outer surface of said piston and is engaged in a peripheral groove of said piston.

11. The drive device according to claim 8, wherein said cylinder is connected to the gas generator via an angled passage said relief path being formed as bore which is sealed by means of said closure element in an extension of one of the angled branches of said passage.

12. The drive device according to claim 1, wherein said closure element consists of a eutectic alloy.

13. The drive device according to claim 12, wherein said eutectic alloy consists of about 55.5% by weight Bi and about 44.5% by weight Pb.

14. The drive device according to claim 1, wherein said closure element consists of a plastic.

15. The drive device according to claim 14, wherein said plastic is polypropylene.

* * * * *